(12) United States Patent
Kemper et al.

(10) Patent No.: US 10,002,175 B2
(45) Date of Patent: Jun. 19, 2018

(54) HYBRID OLTP AND OLAP HIGH PERFORMANCE DATABASE SYSTEM

(75) Inventors: Alfons Kemper, Garching (DE); Neumann Thomas, Garching (DE)

(73) Assignee: TECHNISCHE UNIVERSITAT MUNCHEN, Munich (DE)

( * ) Notice: Subject to any disclaimer, the term of this patent is extended or adjusted under 35 U.S.C. 154(b) by 1307 days.

(21) Appl. No.: 13/698,427

(22) PCT Filed: Apr. 4, 2011

(86) PCT No.: PCT/EP2011/055221
§ 371 (c)(1),
(2), (4) Date: Nov. 16, 2012

(87) PCT Pub. No.: WO2011/144382
PCT Pub. Date: Nov. 24, 2011

(65) Prior Publication Data
US 2013/0073513 A1 Mar. 21, 2013

(30) Foreign Application Priority Data
May 17, 2010 (GB) .................................. 1008184.2

(51) Int. Cl.
*G06F 17/30* (2006.01)
(52) U.S. Cl.
CPC .............. *G06F 17/30587* (2013.01)
(58) Field of Classification Search
CPC .................. G06F 17/30587; G06F 17/30088
See application file for complete search history.

(56) References Cited

U.S. PATENT DOCUMENTS 8,826,273 B1 * 9/2014 Chen ................................ 718/1
2003/0204534 A1 10/2003 Hopeman et al.
(Continued)

FOREIGN PATENT DOCUMENTS

EP 1 610 235 A1 12/2005
EP 2 040 180 A1 3/2009

OTHER PUBLICATIONS

Conn S S: "OLTP and OLAP Data Integration: A Review of Feasible Implementation Methods and Architectures for Real Time Data Analysis," Souheastcon, 2005. Proceedings. IEEE. Fort Lauderdale, FL, USA Apr. 8-10, 2005, Piscataway, NJ, USA, IEEE, Apr. 8, 2005, pp. 515-520.
(Continued)

*Primary Examiner* — Kristopher Andersen
(74) *Attorney, Agent, or Firm* — Budzyn IP Law, LLC

(57) ABSTRACT

There is provided a method of maintaining a hybrid OLTP and OLAP database, the method comprising: executing one or more OLTP transactions; creating a virtual memory snapshot; and executing one or more OLAP queries using the virtual memory snapshot. Preferably, the method further comprises replicating a virtual memory page on which a data object is stored in response to an update to the data object, whereby the updated data object is accessible for OLTP transactions, while the non-updated data object remains accessible for OLAP queries. Accordingly, the present invention provides a hybrid system that can handle both OLTP and OLAP simultaneously by using hardware-assisted replication mechanisms to maintain consistent snapshots of the transactional data.

11 Claims, 13 Drawing Sheets

(56) References Cited

U.S. PATENT DOCUMENTS

2006/0047926 A1* 3/2006 Zheng .................. G06F 3/0608
 711/162
2007/0162512 A1* 7/2007 Kollar ............... G06F 17/30575
2008/0098154 A1* 4/2008 Traut .................... G06F 9/4856
 711/6

OTHER PUBLICATIONS

International Search Report dated Jun. 29, 2011, issued in International Application No. PCT/EP2011/055221 (3 pages).

* cited by examiner

HYBRID OLTP AND OLAP HIGH PERFORMANCE DATABASE SYSTEM

BACKGROUND

The two areas of online transaction processing (OLTP) and online analytical processing (OLAP) present different challenges for database architectures. In conventional systems, customers with high rates of mission-critical transactions have split their data into two separate systems, one database for OLTP and one so-called data warehouse for OLAP. While allowing for reasonable transaction rates, this separation has many disadvantages including data freshness issues due to the delay caused by only periodically initiating the Extract Transform Load-data staging and excessive resource consumption due to maintaining two separate information systems.

Historically, database systems were mainly used for online transaction processing. Typical examples of such transaction processing systems are sales order entry or banking transaction processing. These transactions access and process only small portions of the entire data and, therefore, can be executed quite fast. According to the standardized TPC-C benchmark results the currently highest-scaled systems can process more than 100.000 such sales transactions per second.

About two decades ago a new usage of database systems evolved: Business Intelligence (BI). The BI-applications rely on long running so-called Online Analytical Processing (OLAP) queries that process substantial portions of the data in order to generate reports for business analysts. Typical reports include the aggregated sales statistics grouped by geographical regions, or by product categories, or by customer classifications, etc. Initial attempts, such as SAP's EIS project, to execute these queries on the operational OLTP database were dismissed as the OLAP query processing led to resource contentions and severely hurt the mission-critical transaction processing. Therefore, the data staging architecture exemplified in FIG. 1 was devised. Here, the transaction processing is carried out on a dedicated OLTP database system. In addition, a separate Data Warehouse system is installed for the business intelligence query processing. Periodically, e.g., during the night, the OLTP database changes are extracted, transformed to the layout of the data warehouse schema, and loaded into the data warehouse. This data staging and its associated ETL process exhibit several inherent drawbacks:

- Stale Data: As the ETL process can only be executed periodically, the data warehouse state does not reflect the latest business transactions. Therefore, business analysts have to base their decisions on stale (outdated) data.
- Redundancy: The usage of two systems incurs the cost of maintaining two redundant copies of the data. On the positive side, the redundancy allows to model the data in an application specific way: in normalized tables for OLTP-processing and as a star-scheme for OLAP queries.
- High expense: Maintaining two separate systems incurs a technical and economical penalty as expenses for two systems (hardware, software, etc) and maintenance costs for two systems and the complex ETL process have to be taken into account.

It is an object of the present invention to address these drawbacks.

SUMMARY OF THE INVENTION

According to the invention there is provided a method as defined in claim 1. Advantageous embodiments are recited in the remaining claims.

The present invention provides a hybrid system that can handle both OLTP and OLAP simultaneously by using hardware-assisted replication mechanisms to maintain consistent snapshots of the transactional data. In one embodiment, the present invention provides a main-memory database system that guarantees the ACID properties of OLTP transactions and executes OLAP query sessions (multiple queries) on the same, arbitrarily current and consistent snapshot. The utilization of processor-inherent support for virtual memory management (address translation, caching, copy on update) can yield both at the same time high transaction rates and low OLAP query response times.

According to an embodiment of the present invention, the separation of OLTP database and OLAP data warehouse system is abandoned. The processing performance required for the integration of these two very different workloads on the same system can be achieved by main-memory database architectures.

The present invention enables execution of OLAP queries on the up-to-date state of the transactional OLTP data. This is in contrast to conventional systems that exercise separation of transaction processing on the OLTP database and query processing on the data warehouse that is only periodically refreshed—resulting in queries based on stale (outdated) data.

In an embodiment of the invention, the transactional database is provided with query processing capabilities thereby to shift (some of) the query processing from the data warehouse to the OLTP system. For this purpose, mixed workloads of OLTP transaction processing and OLAP query processing on the same database are supported. This is somewhat counter to the recent trend of building dedicated systems for different application scenarios. The integration of these two very different workloads on the same system can best be implemented if processing performance is improved, for example through main-memory database architectures.

On first view, the dramatic explosion of the (Internet accessible) data volume may contradict this premise of keeping all transactional data main memory resident. However, a closer examination shows that the business critical transactional database volume has limited size, which favors main memory data management. To corroborate this assumption one may analyze the estimated transaction volume of Amazon. The order processing data volume has an estimated yearly revenue of about 15 billion Euros. Assuming that an individual order line has a value of about 15 Euros and each order line incurs stored data of about 54 bytes—as specified for the TPC-C-benchmark—the total data volume would be 54 GB per year for the order lines which is the dominating repository in such a sales application.

This estimate neither includes the other data (customer and product data) which increases the volume nor the possibility to compress the data to decrease the volume. Nevertheless it is safe to assume that the yearly sales data can be fit into main memory of a large scale server. Furthermore, extrapolating the past developments it is safe to forecast that the main memory capacity of commodity as

DETAILED DESCRIPTION OF EXEMPLARY EMBODIMENTS OF THE PRESENT INVENTION

Figure 1:
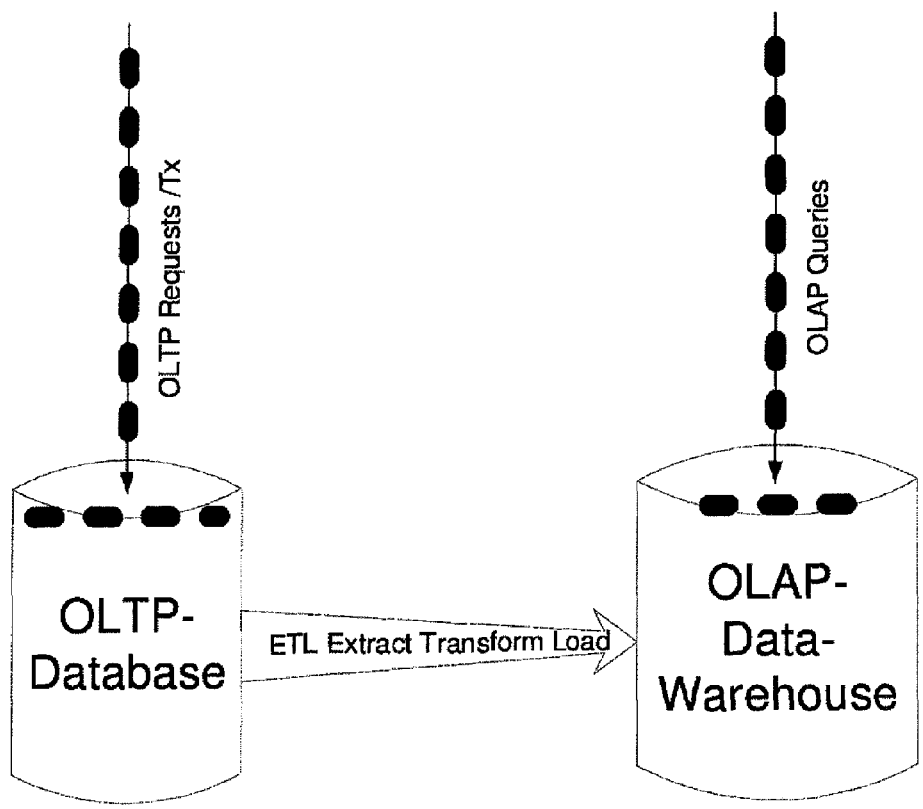
FIG. 1 illustrates the prior art separation of OLTP database and OLAP data warehouse.
Figure 2:
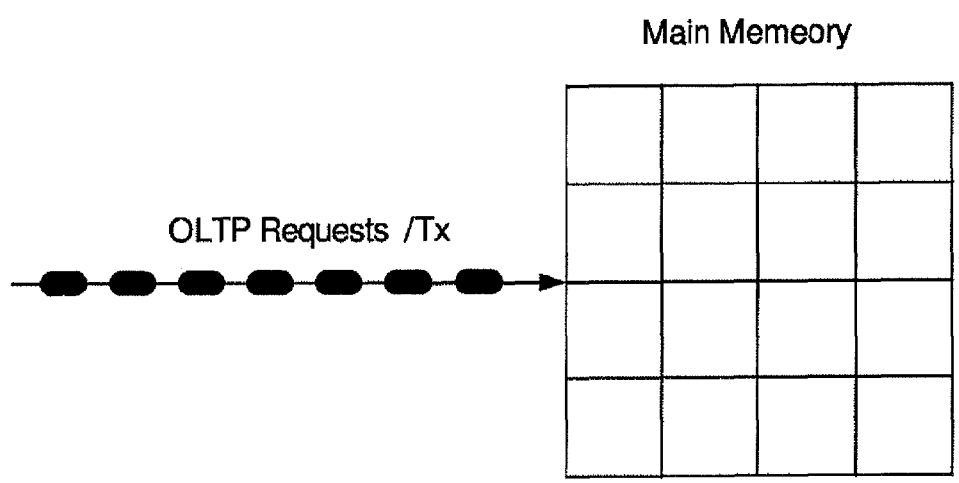
FIG. 2 illustrates the main memory OLTP database architecture in accordance with an embodiment of the present invention.

The main-memory architecture for transaction processing in accordance with an embodiment of the present invention is illustrated in FIG. 2. In this embodiment, a single-threading approach has been adopted wherein all OLTP transactions are executed sequentially. This architecture obviates the need for costly locking and latching of data objects or index structures as the only active update transaction "owns" the entire database. This serial execution approach can be advantageously implemented through a main memory database where there is no need to mask I/0 operations on behalf of one transaction by interleavingly utilizing the CPUs for other transactions. In a main-memory architecture a typical business transaction (e.g., an order entry or a payment processing) has a duration of only a few up to ten microseconds. However, if complex OLAP-style queries were allowed to be injected into the workload queue they would clog the system, as all subsequent OLTP transactions would have to wait for the completion of such a long running query. Even if such OLAP queries finish within, say, 30 ms they would lock the system for a duration in which around 1000 or more OLTP transactions could be completed.

Figure 3:
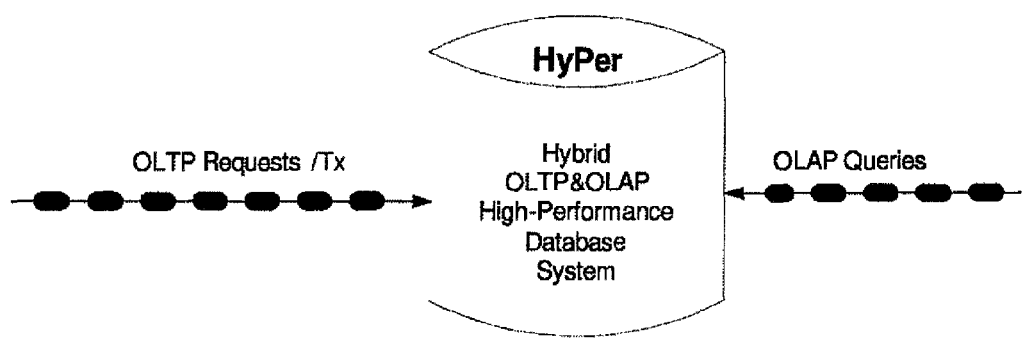
FIG. 3 illustrates the hybrid OLTP and OLAP database architecture in accordance with an embodiment of the present invention.

However, it is desirable to provide a main-memory database system that processes OLTP transactions at rates of tens of thousands per second, and, at the same time, is able to process OLAP queries on up-to-date snapshots of the transactional data. This challenge is illustrated in FIG. 3. According to an embodiment of the present invention, a hybrid system is provided that can handle both OLTP and OLAP simultaneously by using hardware-assisted replication mechanisms to maintain consistent snapshots of the transactional data.

The present invention may be implemented by a main-memory database system that guarantees the ACID properties of OLTP transactions. In particular, logging and backup archiving schemes may be employed for durability and fast recovery. In parallel to the OLTP processing, OLAP query sessions (multiple queries) may be executed on the same, arbitrarily current and consistent snapshot. The utilization of the processor-inherent support for virtual memory management (address translation, caching, copy on update) accomplishes both in the same system and at the same time unprecedented high transaction rates and ultra-low OLAP query response times. A non-transitory article may be provided having a medium on which are stored instructions that, when executed, cause a processor-based system to perform a method of maintaining a hybrid OLTP and OLAP database system comprising a memory, the method comprising: executing one or more OLTP transactions; creating one or more virtual memory snapshots; and, executing one or more OLAP queries using one or more of the virtual memory snapshots.

System Architecture

According to an embodiment of the present invention, OLTP transactions and OLAP queries can be performed on the same main memory resident database. In contrast to old-style disk-based storage servers any database-specific buffer management and page structuring can be omitted. The data resides in simple, main-memory optimized data structures within the virtual memory. Thus, the OS/CPU-implemented address translation can be exploited at "full speed" without any additional indirection. Two predominantly relational database storage schemes can be employed: In the row store approach relations are maintained as arrays of entire records, while in the column store approach the relations are vertically partitioned into vectors of attribute values.

Even though the virtual memory can (significantly) outgrow the physical main memory, the database is preferably limited to the size of the physical main memory in order to avoid OS-controlled swapping of virtual memory pages. Alternatively, the main memory may be supplemented by secondary storage such as a flash memory or a solid-state drive.

OLTP Processing

Since all data is main-memory resident there will never be a halt to await IO. Therefore, a single-threading approach can be relied upon wherein all OLTP transactions are executed sequentially. This architecture obviates the need for costly locking and latching of data objects as the only one update transaction "owns" the entire database. This serial execution approach can be implemented on a main memory database where there is no need to mask IO operations on behalf of one transaction by interleavingly utilizing the CPUs for other transactions. In a main-memory architecture a typical business transaction (e.g., an order entry or a payment processing) has a duration of only around ten microseconds. This translates to throughputs in the order of tens of thousands per second, much more than even large scale business applications require.

Figure 4:
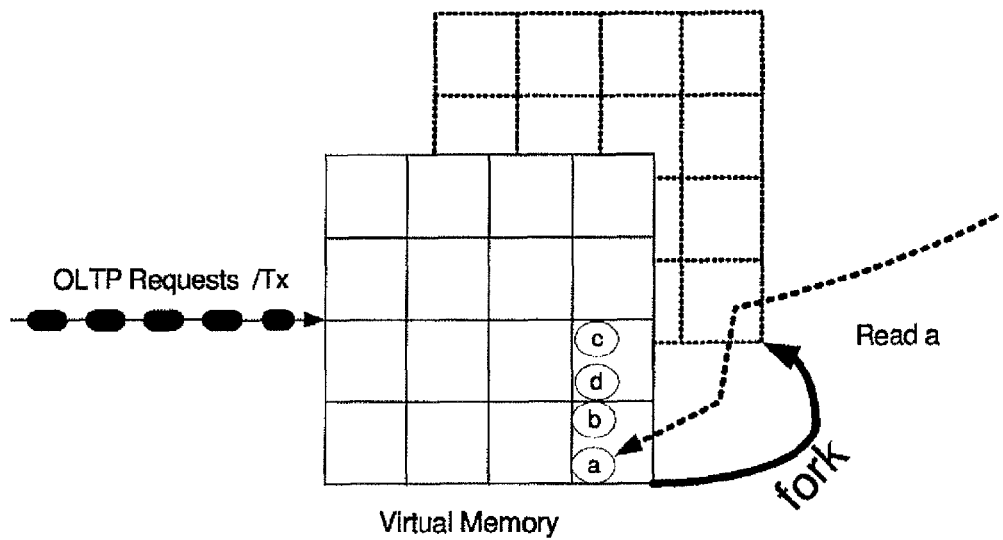
FIG. 4 illustrates the forking of a new virtual memory snapshot in accordance with an embodiment of the present invention.

The serial execution of OLTP transactions is exemplified in FIG. 4 by the queue on the left-hand side in which the transactions are serialized to await execution. The transactions are implemented as stored procedures in a high-level scripting language. This language provides the functionality to look-up database entries by search key, iterate through sets of objects, insert, update and delete data records, etc. The high-level scripting code is then compiled into low-level code that directly manipulates the in-memory data structures.

The OLTP transactions should have short response times in order to avoid long waiting times for subsequent transactions in the queue. This prohibits any kind of interactive transactions, e.g., requesting user input or synchronously invoking a credit card check of an external agency.

OLAP Snapshot Management

If complex OLAP-style queries were allowed to be injected into the OLTP workload queue they would clog the system, as all subsequent OLTP transactions would have to wait for the completion of such a long running query. Even if such OLAP queries finish within, say, 30 ms they lock the system for a duration in which possibly thousands of OLTP transactions could be completed. To achieve the goal to provide a main-memory database system that processes OLTP transactions at rates of tens of thousands per second, and, at the same time, processes OLAP queries on up-to-date snapshots of the transactional data, the operating systems functionality to create virtual memory snapshots for new processes is exploited. This is done by duplicating the OLTP process, i.e. creating a child process of the OLTP process. For example, the OLTP process duplication can be performed by forking (fork( ) system call in Unix). In the following, references to "forking" are intended to refer to any implementation of OLTP process duplication.

Figure 6:
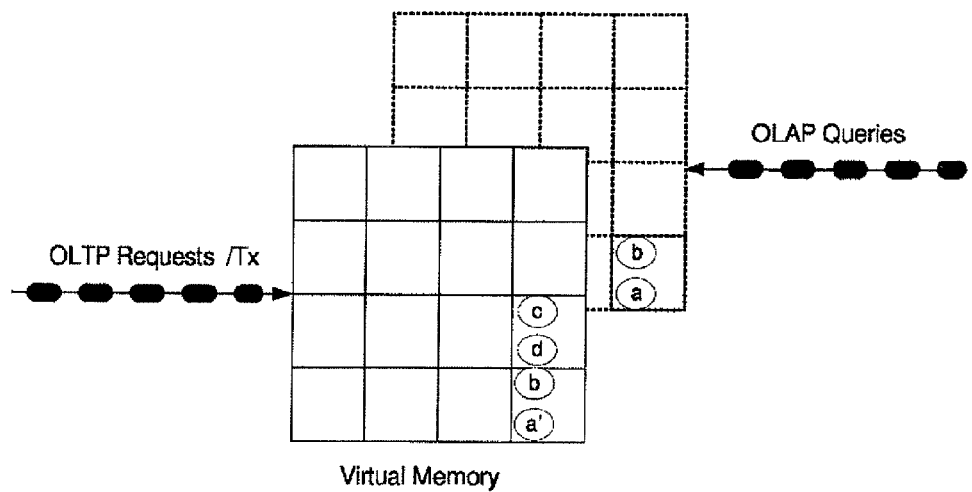
FIG. 6 illustrates the use of a virtual memory snapshot for OLAP querying in accordance with an embodiment of the present invention.

To guarantee transactional consistency, the forking should only be executed in between two (serial) transactions, rather than in the middle of a transaction. The child process obtains an exact copy of the parent processes address space, as exemplified in FIG. 4 by the overlayed page frame panel. The virtual memory snapshot that is created by the fork-operation is used for executing a session of OLAP queries—as indicated in FIG. 6.

Figure 5:
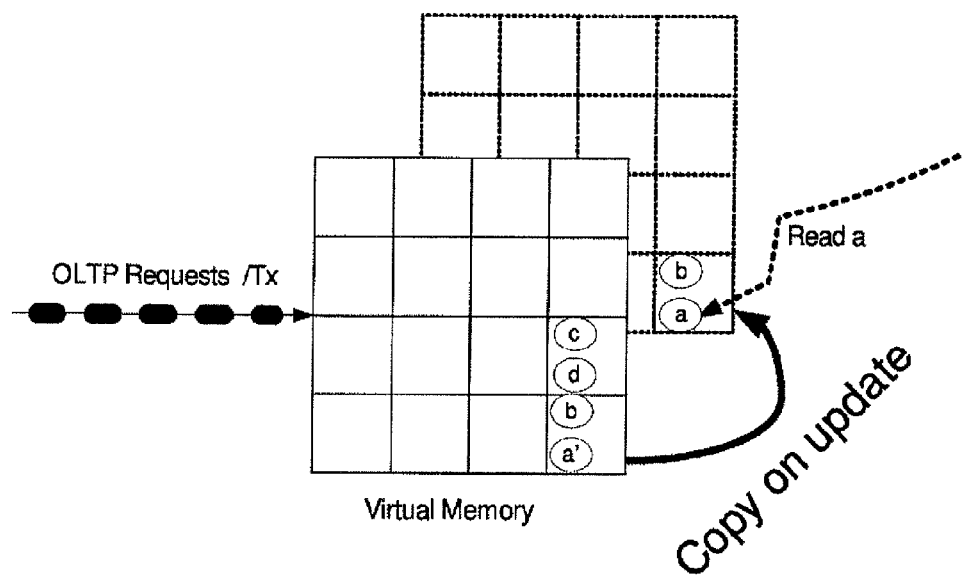
FIG. 5 illustrates a "copy-on update" strategy used in an embodiment of the present invention.

The snapshot stays in precisely the state that existed at the time the fork operation took place. Fortunately, state-of-the art operating systems do not physically copy the memory segments right away. Rather, they employ a lazy "copy-on-update strategy", as illustrated in FIG. 5. Initially, parent process (OLTP) and child process (OLAP) share the same physical memory segments by translating either virtual addresses (e.g., to object a) to the same physical main memory location. The sharing of the memory segments is highlighted in the Figures by dotted frames. A dotted frame represents a virtual memory page that was not (yet) replicated. Only when an object, e.g. data item a, is updated, the OS and hardware-supported copy-on-update mechanism initiates the replication of the virtual memory page on which a resides. Thereafter, there is a new state denoted a' accessible by the OLTP-process that executes the transactions and the old state denoted a, that is accessible by the OLAP query session. Unlike the Figures suggests, the additional page is really created for the OLTP process that initiated the page change and the OLAP snapshot refers to the old page—this detail is important for estimating the space consumption if several such snapshots are created (cf. FIG. 7).

Another intuitive way to view the functionality is as follows: The OLTP process operates on the entire database, part of which is shared with the OLAP module. All OLTP changes are applied to a separate copy (area), the Delta—consisting of copied (shadowed) database pages. Thus, the OLTP process creates its working set of updated pages on demand. This is somewhat analogous to swapping pages into a buffer pool—however, the copy on demand of updated pages is three to four orders of magnitude faster as it takes only 2 µs to copy a main memory page instead of 10 ms to handle a page fault in the buffer pool. Every "now and then" the Delta is merged with the OLAP database by forking a new process for an up-to-date OLAP session. Thereby, the Delta is conceptually re-integrated into the (main snapshot) database. Unlike any software solution for merging a Delta back into the main database, the hardware-supported virtual memory merge (fork) can be achieved very efficiently in subseconds.

The replication (into the Delta) is carried out at the granularity of entire pages, which usually have a default size of 4 KB. In the present example, the state change of a to a' induces not only the replication of a but also of all other data items on this page, such as b, even though they have not changed. This drawback is compensated for by the very effective and fast virtual memory management by the OS and the processor, such as ultra-efficient VM address transformation via TLB caching and copy-on-write enforcement. Traditional shadowing concepts in database systems are based on pure software mechanisms that maintain shadow copies at the page level or shadow individual objects.

Snapshots incur storage overhead proportional to the number of updated pages by the parent (i.e., the OLTP request executing) process. It replicates the delta (corresponding to the changed pages) between the memory state of the OLTP process at the time when the fork operation creates the snapshot and the current memory state of the OLTP process (The OLAP processes (almost) never change the shared pages—which would of course be unproblematic because of the copy-on-update mechanism. However, to increase performance they should allocate their temporary data structures in non-shared main memory areas). If the main memory capacity is scarce, the OLAP query engine can employ secondary storage devices (e.g. disks), thereby trading main memory capacity for longer execution time. Sorting a relation by creating disk-based runs is one prominent example. All OLAP queries, denoted by the ovals, in the OLAP Queries queue access the same consistent snapshot state of the database. Such a group of queries may be referred to as a query session to denote that a business analyst could use such a session for a detailed analysis of the data by iteratively querying the same state to, e.g., drill down to more details or roll up for a better overview.

Multiple OLAP Sessions

So far a database architecture has been described that utilizes two processes, one for OLTP and another one for OLAP. As the OLAP queries are read-only they could easily be executed in parallel in multiple threads that share the same address space. Still, any synchronization (locking and latching) overhead can be avoided as the OLAP queries do not share any mutable data structures. Modern multicore computers which typically have more than ten cores can yield a substantial speed up via this inter-query parallelization.

Figure 7:
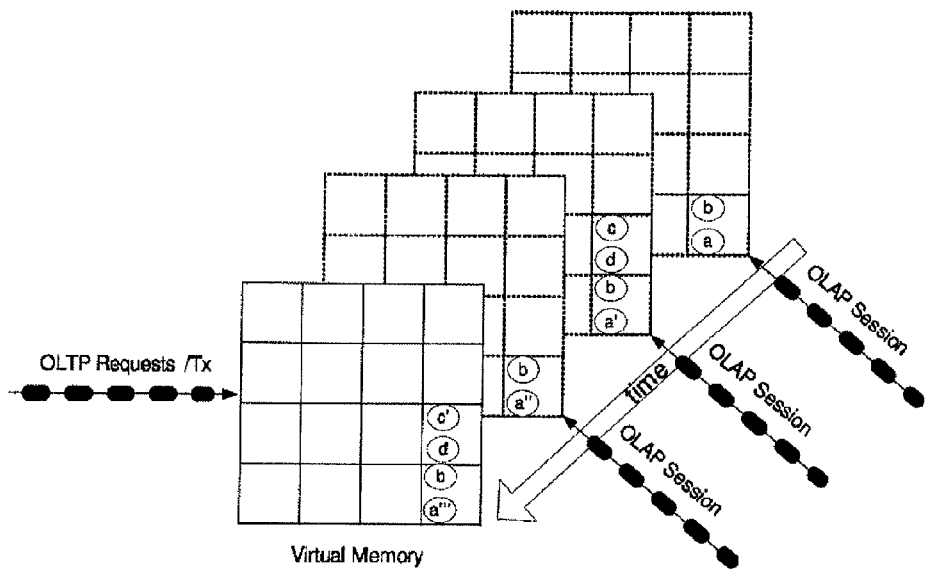
FIG. 7 illustrates multiple OLAP sessions at different points in time in accordance with an embodiment of the present invention.

Another possibility to make good use of the multi-core servers is to create multiple snapshots. In particular, arbitrarily current snapshots can be obtained. This can simply he achieved by periodically (or on demand) forking a new snapshot and thus starting a new OLAP query session process. This is exemplified in FIG. 7, illustrating the one and only OLTP processes current database state (the front panel) and three active query session processes' snapshots, wherein the oldest is the one in the background. The successive state changes are highlighted by the four different states of data item a (the oldest state), a', a", and a'" (the youngest transaction consistent state). Obviously, most data items do not change in between different snapshots as it is expected to create snapshots for most up-to-date querying at intervals of a few seconds rather than minutes or hours as is the case in current separated data warehouse solutions with ETL data staging. The number of active snapshots is, in principle, not limited, as each "lives" in its own process. By adjusting the priority it can be made sure that the mission critical OLTP process is always allocated a core, even if the OLAP processes are numerous and/or utilize multi-threading and thus exceed the number of cores.

A snapshot will be deleted after the last query of a session is finished. This is done by simply terminating the process that was executing the query session. It is not necessary to delete snapshots in the same order as they were created. Some snapshots may persist for a longer duration, e.g., for detailed stocktaking purposes. However, the memory overhead of a snapshot is proportional to the number of transactions being executed from creation of this snapshot to the time of the next younger snapshot (if it exists or to the actual time). FIG. 7 illustrates this through the data item c which is physically replicated for the "middle age" snapshot and thus shared and accessible by the oldest snapshot. Somewhat against intuition, it is still possible to terminate the middle-aged snapshot before the oldest snapshot as the page on which c resides will be automatically detected by the OS/processor as being shared with the oldest snapshot via a reference counter associated with the physical page. Thus it survives the termination of the middle-aged snapshot—unlike the page on which a' resides which is freed upon termination of the middle-aged snapshot process. The youngest snapshot accesses the state c' that is contained in the current OLTP processes address space.

Multi-Threaded OLTP Processing

As already outlined the OLAP process may be configured as multiple threads to better utilize the multiple cores of modern computers. This is also possible for the OLTP process. One simple extension is to admit multiple read-only OLTP transactions in parallel. As soon as a read/write-transaction is at the front of the OLTP workload queue the system is quiesced and transferred back into sequential mode until no more update-transactions are at the front of the queue. In realistic applications, there are usually many more read-only transactions than update transactions—therefore it can be expected to obtain some level of parallelism, which could even be increased by (carefully) rearranging the OLTP workload queue.

There are many application scenarios where it is natural to partition the data. One very important application class for this is multi-tenancy. The different database users (called tenants) work on the same or similar database schemas but do not share their transactional data. Rather, they maintain their private partitions of the data. Only some read-mostly data (e.g., product catalogs, geographical information, business information catalogs like Dun & Bradstreet) is shared among the different tenants.

Interestingly, the widely known industry-standard for transaction processing, the TPC-C benchmark (www.tpc.org) exhibits a similar partitioning as most of the data can he partitioned horizontally by the Warehouse to which it belongs. The only exception is the Items table, which corresponds to the present shared data partition.

Figure 8:
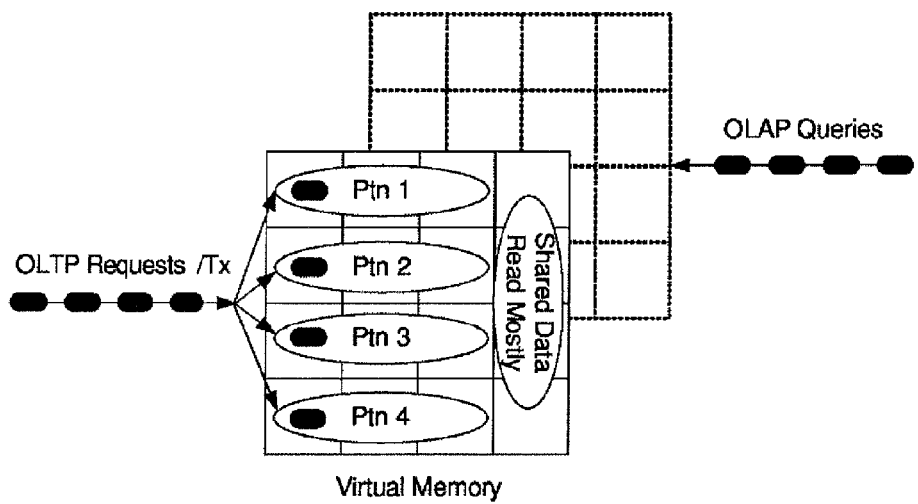
FIG. 8 illustrates multi-threaded OLTP processing on partitioned data in accordance with an embodiment of the present invention.

In such a partitioned application scenario the OLTP process can be configured as multiple threads to increase performance even further via parallelism. This is illustrated in FIG. 8. As long as the transactions access and update only their private partition and access (not update) the shared data multiple such transactions can be run in parallel—one per partition. The figure illustrates this as each oval (representing a transaction) inside the panel corresponds to one such partition constrained transaction executed by a separate thread.

However, transactions reading across partitions or updating the shared data partition require synchronization. In one embodiment, cross-partition transactions request exclusive access to the system—just as in a purely sequential approach. This is sufficiently efficient in a central system where all partitions reside on one node. However, if the nodes are distributed across a compute cluster, which necessitates a two-phase commit protocol for multi-partition transactions, more advanced synchronization approaches are beneficial.

The OLAP snapshots can be forked as before—except that all threads are quiesced before this can be done in a transaction consistent manner. The OLAP queries can be formulated across all partitions and the shared data, which is beneficial in multi-tenancy applications for administrative purposes, for example.

The partitioning of the database can be further exploited for a distributed system that allocates the private partitions to different nodes in a compute cluster. The read-mostly, shared partition can be replicated across all nodes. Then, partition constrained transactions can be transferred to the corresponding node and run in parallel without any synchronization overhead. Synchronization is needed for partition-crossing transactions and for the synchronized snapshot creation across all nodes.

Snapshot Isolation of OLAP Query Sessions

In snapshot isolation a transaction continuously sees the transaction consistent database state as it existed at a point in time (just) before the transaction started. There are different possibilities to implement such a snapshot while database modifications are running in parallel:

Roll-Back: This method updates the database objects in place. If an older query requires an older version of a data item it is created from the current version by undoing all updates on this object. Thus, an older copy of the object is created in a so-called roll-back segment by reversely applying all undo log records up to the required point in time.

Versioning: All object updates create a new time-stamped version of the object. Thus, a read on behalf of a query retrieves the youngest version (largest timestamp) whose timestamp is smaller than the starting time of the query. The versioned objects are either maintained durably (which allows time traveling queries) or temporarily until no more active query needs to access them.

Shadowing: Originally shadowing was created to obviate the need for undo logging as all changes were written to shadows first and then installed in the database at transaction commit time. However, the shadowing concept can also be applied to maintaining snapshots.

Virtual Memory Snapshots: The snapshot mechanism in accordance with an embodiment of the present invention explicitly creates a snapshot for a series of queries, called a query session. In this respect, all queries of a Query Session are bundled to one transaction that can rely on the same consistent state preserved via the fork process.

Figure 9:
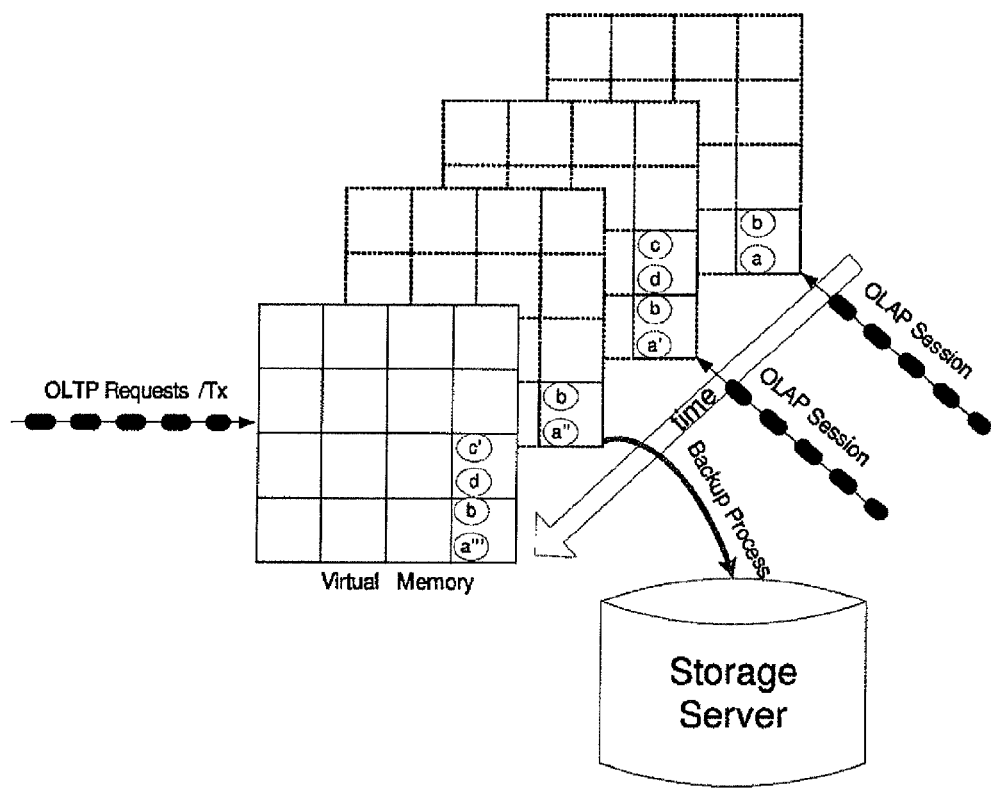
FIG. 9 illustrates a consistent snapshot backup archive in accordance with an embodiment of the present invention.

Also, VM snapshots can be exploited for creating backup archives of the entire database on non-volatile secondary servers or storage. This process is illustrated in FIG. 9. Typically, the archive is written via a high-bandwidth network of 1 to 10 Gb/s to a dedicated storage server within the same compute center. To maintain this transfer speed the storage server has to employ several (around 10) disks for a corresponding aggregated bandwidth.

OLTP Transaction Synchronization

In the single-threaded mode the OLTP transactions do not need any synchronization mechanisms as they own the entire database.

In the multi-threaded mode two types of transactions are distinguished:

Partition-constrained transactions can read and update the data in their own partition as well as read the data in the shared partition. However, the updates are limited to their own partition.

Partition crossing transactions are those that, in addition, update the shared data or access (read or update) data in another partition.

Transactions of the latter class of partition crossing transactions should be very rare as updates to shared data seldom occur and the partitioning is derived such that transactions usually operate only on their own data. The classification of the stored procedure transactions in the OLTP workload is done automatically based on analyzing their implementation code. If, during execution it turns out that a transaction was erroneously classified as "partition constrained" it is rolled back and reinserted into the OLTP workload queue as "partition crossing".

Preferably, at most one partition constrained transaction per partition in parallel is admitted. Under this constraint, there is no need for any kind of locking or latching as the partitions have non-overlapping data structures and the shared data is accesses read-only.

A partition crossing transactions, however, has to be admitted in exclusive mode. In essence, it has to preclaim an exclusive lock (or, in POSIX terminology, it has to pass a barrier before being admitted) on the entire database before it is admitted. Thus, the execution of partition crossing transactions is relatively costly as they have to wait until all other transactions are terminated and for their duration no other transactions are admitted. Once admitted to the system, the transaction runs at full speed as the exclusive admittance of partition crossing transactions again obviates any kind of locking or latching synchronisation of the shared data partition or the private data partitions.

Durability

Figure 10:
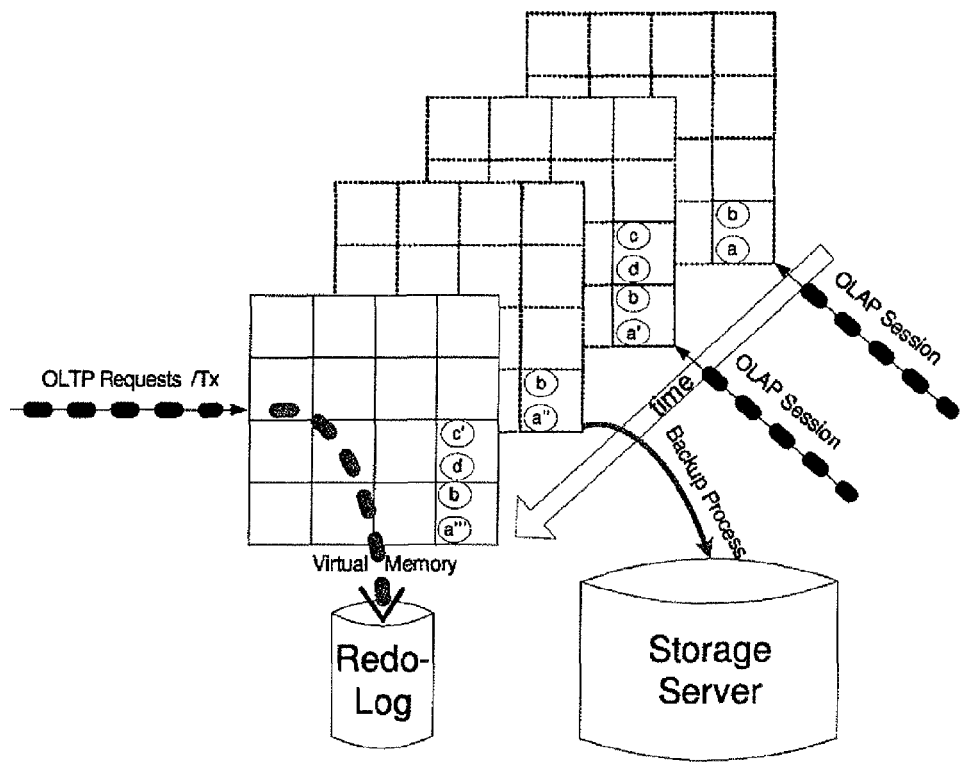
FIG. 10 illustrates redo logging in accordance with an embodiment of the present invention.

The durability of transactions requires that all effects of committed transactions have to be restored after a failure. To achieve this classical redo logging is employed. This is highlighted by the gray ovals emanating from the serial transaction stream leading to the non-volatile Redo-Log storage device in FIG. 10. Logical redo logging is employed by logging the parameters of the stored procedures that represent the transactions. In traditional database systems logical logging is problematic because after a system crash the database may be in an action-inconsistent state. This cannot happen in the illustrated embodiment of the present invention as a restart is performed from a transaction consistent archive (cf. FIG. 9). It is only important to write these logical log records in the order in which they were executed in order to be able to correctly recover the database. In the single threaded OLTP configuration this is easily achieved. For the multi-threaded system only the log records of the partition crossing transactions have to be totally ordered w.r.t. to all transactions while the partition constrained transactions' log records may he written in parallel and thus only sequentialized per partition.

Figure 11:
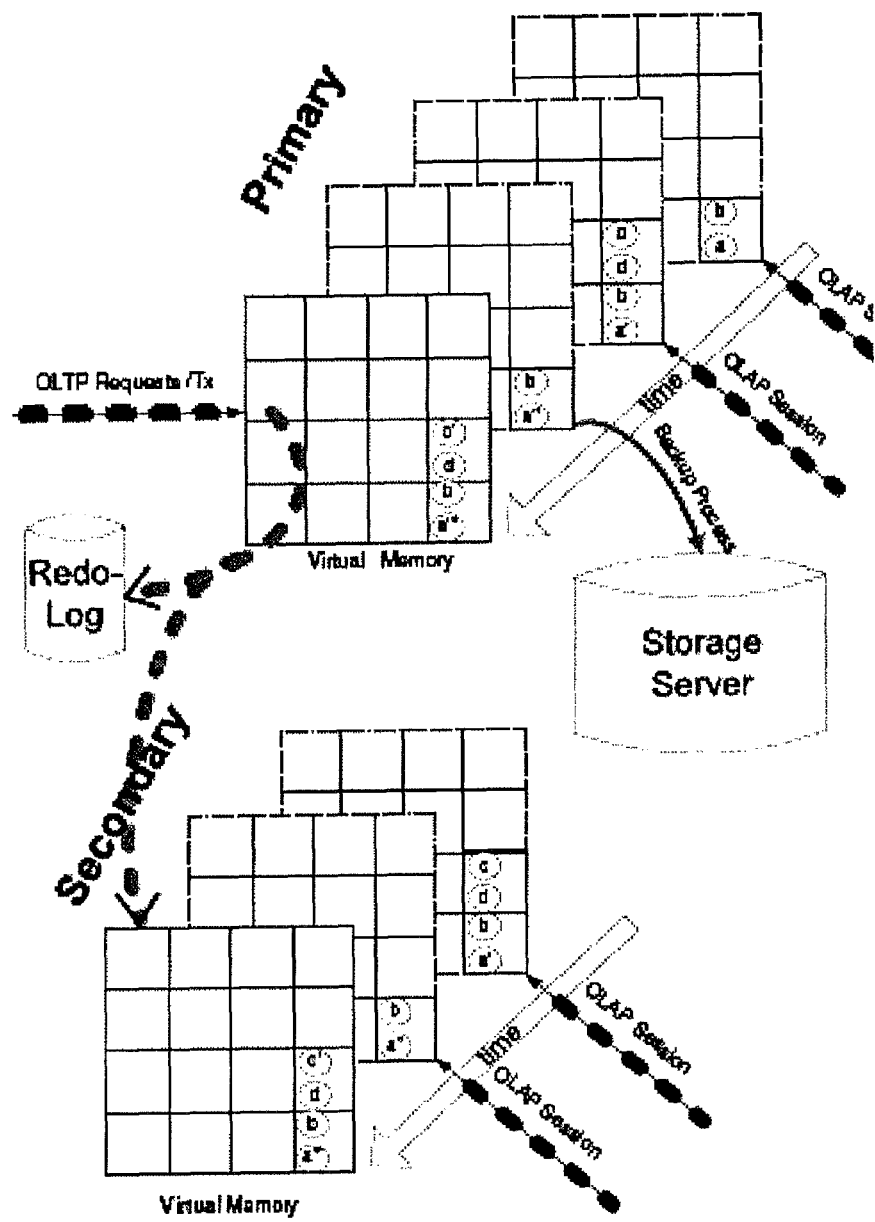
FIG. 11 illustrates the use of a secondary server that acts as a stand-by for OLTP processing and as an active OLAP processor, in accordance with an embodiment of the present invention.

High Availability and OLAP Load Balancing via Secondary Server: The redo log stream can also be utilized to maintain a secondary server. This secondary server merely executes the same transactions as the primary server. In case of a primary server failure the transaction processing is switched over to the secondary server. However, it is preferable not to abandon the writing of redo log records to stable storage and to only rely on the secondary server for fault tolerance. A software error may—in the worst case— lead to a "synchronous" crash of primary and secondary servers. The secondary server is typically under less load as it needs not execute any read-only OLTP transactions and, therefore, has less OLTP load than the primary server. This can be exploited by delegating some (or all) of the OLAP querying sessions to the secondary server. Instead of—or in addition to—forking an OLAP session's process on the primary server the secondary server could be used as well. The usage of a secondary server that acts as a stand-by for OLTP processing and as an active OLAP processor is illustrated in FIG. 11. Not shown in the figure is the possibility to use the secondary server instead of the primary server for writing a consistent snapshot to a storage server's archive. Thereby, the backup process is delegated from the primary to the less-loaded secondary server.

Optimization of the Logging

The write ahead logging (WAL) principle may turn out to become a performance bottleneck as it requires to flush log records before committing a transaction. This is particularly costly in a single-threaded execution as the transaction has to wait.

Two commonly employed strategies are possible:

Group commit or

Asynchronous commit

Group commit is, for example, configurable in IBM's DB2. A final commit of a transaction is not executed right after the end of a transaction. Rather, log records of several transactions are accumulated and flushed in a batched mode. Thus, the acknowledgement of a commit is delayed. While waiting for the batch of transactions to complete and their log records being flushed all their locks are already freed. This is called early log release. In the present non-locking system this translates to admitting the next transaction(s) for the corresponding partition. Once the log buffer is flushed for the group of transactions, their commit is acknowledged to the client.

Another, less safe, method relaxes the WAL principle by avoiding to wait for the flushing of the log records. As soon as the log records are written into the volatile log buffer the transaction is committed. This is called "asynchronous" commit. In the case of a failure some of these log records may be lost and thus the recovery process will miss those committed transactions during restart.

Atomicity

Figure 12:
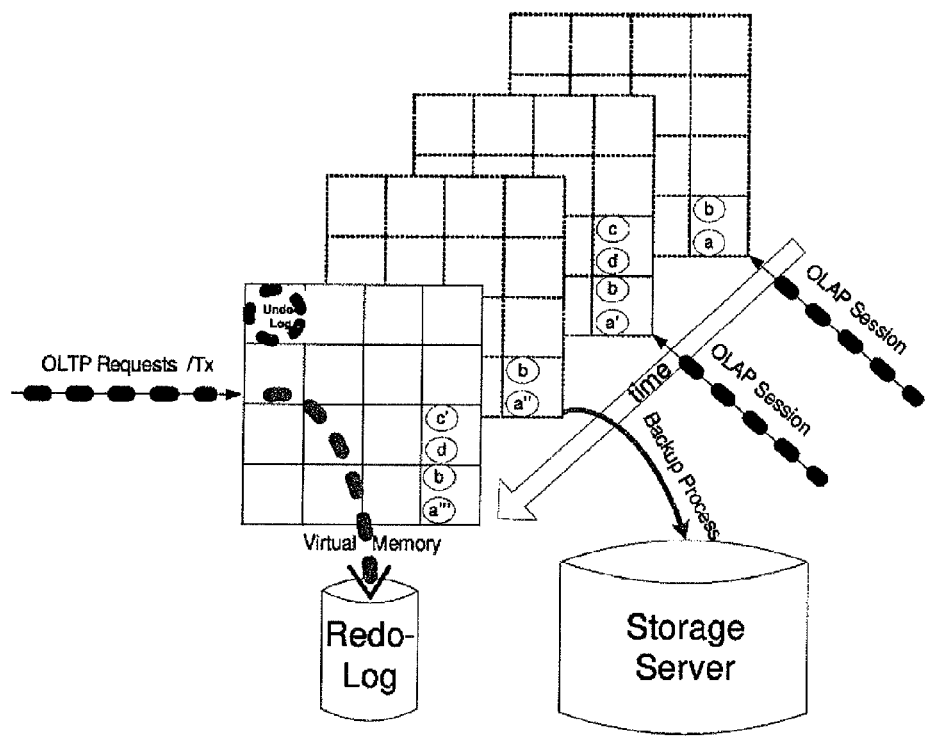
FIG. 12 illustrates undo logging for active transactions in accordance with an embodiment of the present invention.

The atomicity of transactions requires to be able to eliminate any effects of a failed transaction from the database. Only explicitly aborted transactions need to be considered, called the R1-recovery. The so-called R3-recovery that demands that updates of loser-transactions (those that were active at the time of the crash) are undone in the restored database is not needed in the present embodiment, as the database is in volatile memory only and the logical redo logs are written only at the time when the successful commit of the transaction is guaranteed. Furthermore, the archive copy of the database that serves as the starting point for the recovery is transaction consistent and, therefore, does not contain any operations that need to he undone during recovery (cf. FIG. 9). As a consequence, undo logging is only needed for the active transaction (in multi-threaded mode for all active transactions) and can be maintained in volatile memory only. This is highlighted in FIG. 12 by the ring buffer in the top left side of the page frame panel. During transaction processing the before images of any updated data objects are logged into this buffer. The size of the ring buffer is quite small as it is bounded by the number of updates per transaction (times the number of active transactions in multi-threaded operation).

Cleaning Action-Consistent Snapshots

The undo-logging can also be used to create a transaction-consistent snapshot out of an action-consistent VM snapshot that was created while one ore more transactions were active. This is particularly beneficial in a multi-threaded OLTP system as it avoids having to completely quiesce the transaction processing. After forking the OLAP process including its associated VM snapshot the undo log records are applied to the snapshot state—in reverse chronological order. As the undo log buffer reflects all effects of active transactions (at the time of the fork)—and only those—the resulting snapshot is transaction-consistent and reflects the state of the database before initiation of the transactions that were still active at the time of the fork—including all transactions that were completed up to this point in time.

Recovery After a System Failure

During recovery it is possible to start out with the youngest fully written archive, which is restored in main memory. Then the Redo Log is applied in chronological order— starting with the first redo log entry after the fork for the snapshot of the archive. For example, if the archive can be restored at a bandwidth of up to 10 Gb/s (limited by the network's bandwidth from the storage server) and the redo log can be applied at transaction rates of 100,000 per second, the fail-over time for a typical large enterprise (e.g., 100 GB database and thousands of update transactions per second) is in the order of one to a few minutes only—if backup archives are written on an hourly basis. If this fail-over time cannot be tolerated it is also possible to rely on replicated servers, one in active mode and the other one performing the same transactions, e.g., via redo log "sniffing", as illustrated in FIG. 11. In the case of a failure a simple switch-over restores the system.

Figure 13:
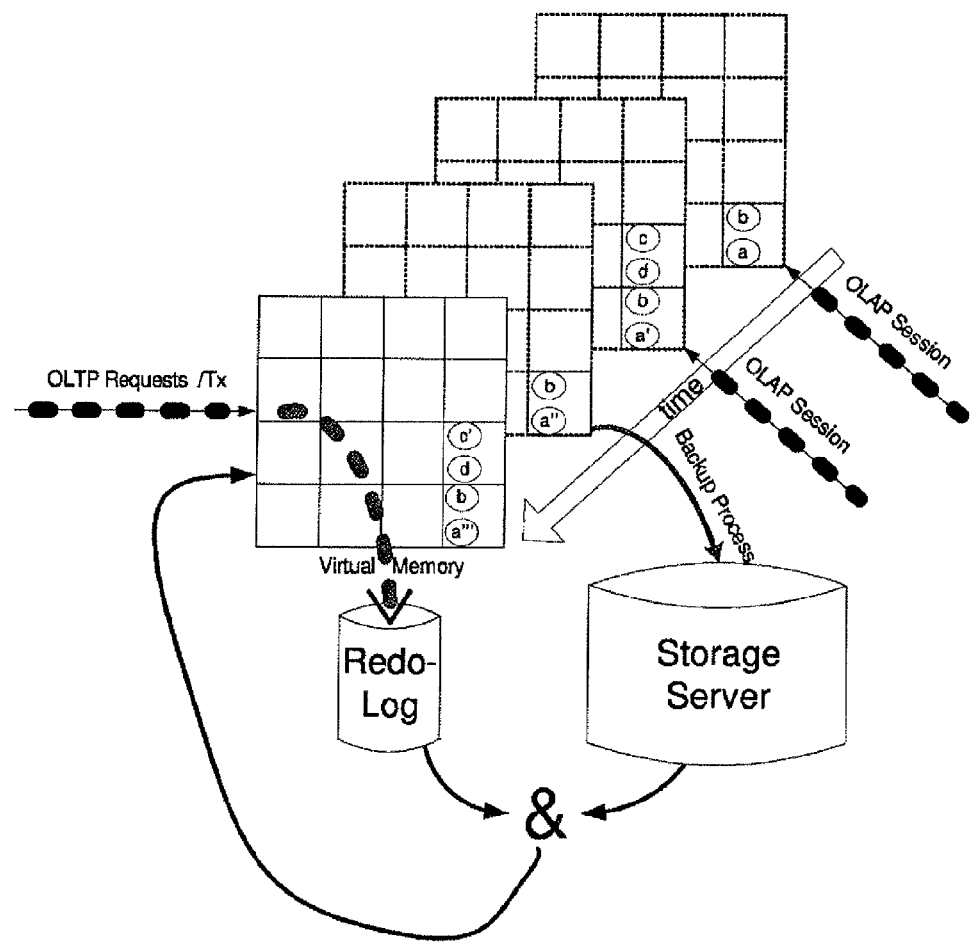
FIG. 13 illustrates a recovery process comprising (1) loading archived backup and (2) applying redo log in accordance with an embodiment of the present invention.

The recovery process is sketched in FIG. 13.

It will be appreciated that the above described embodiments are described as examples only, and that modifications to these embodiments are included within the scope of the appended claims.

The invention claimed is:

1. A method of maintaining a hybrid online transaction processing ("OLTP") and online analytical processing ("OLAP") database system comprising a memory, the method comprising:
    creating, based on data objects in the memory, one or more virtual memory pages;
    forking a first of the one or more virtual memory pages to generate a forked virtual memory page;
    updating when a data object is to be updated with an update, using copy-on-update functionality, the first virtual memory page with the update to create an updated virtual memory page;
    forking the updated virtual memory page to generate a second forked virtual memory page;
    executing one or more OLTP transactions using the updated virtual memory page; and
    executing, in parallel, multiple OLAP queries using the forked virtual memory page and the second forked virtual memory page,
    wherein the one or more OLTP transactions are executed in a first address space, wherein creating the one or more virtual memory pages comprises providing a second address space, and wherein the OLAP queries are executed in the second address space.

2. The method of claim 1, wherein the database system stores private data in partitions and shared data, wherein the partitions may reside on different data processing systems, the method comprising:
    executing, in parallel, OLTP transactions that comprise read and/or update accesses to the private data or read accesses to the shared data;
    executing, in sequence, OLTP transactions that comprise read accesses across the partitions or update accesses to the shared data; and/or
    executing the OLAP queries across one or more of the partitions and the shared data.

3. The method of claim 1, wherein the one or more virtual memory pages are transaction-consistent.

4. The method of claim 3, further comprising creating the one or more virtual memory pages when no OLTP transaction is active.

5. The method of claim 3, further comprising creating the one or more virtual memory pages when one or more OLTP transactions are active, and using an undo-log mechanism to adapt the one or more virtual memory pages to represent a state of the database system before the one or more active OLTP transactions were initiated.

6. The method of claim 1, further comprising creating new virtual memory pages periodically or on demand.

7. The method of claim 1, further comprising using an existing hardware-supported memory consistency control mechanism to identify when a data object in the database system is updated and to trigger creation of a new physical copy of a corresponding page.

8. The method of claim 1, further comprising deleting the forked virtual memory page after completion of a corresponding OLAP query.

9. The method of claim 1, further comprising using the one or more virtual memory pages to provide a transaction-consistent backup of the database system.

10. The method of claim 9, further comprising using the transaction-consistent backup and a redo log mechanism to restore the database system.

11. The method of claim 1, further comprising:
    maintaining a primary server to execute the one or more OLTP transactions, and
    maintaining a secondary server to also execute at least a portion of the one or more OLTP transactions executed by the primary server, in particular all OLTP transactions comprising update accesses to data, and to execute at least some of the OLAP queries.

* * * * *